Jan. 6, 1942.  A. J. OKER  2,269,037
OPHTHALMIC MOUNTING
Filed Oct. 14, 1937
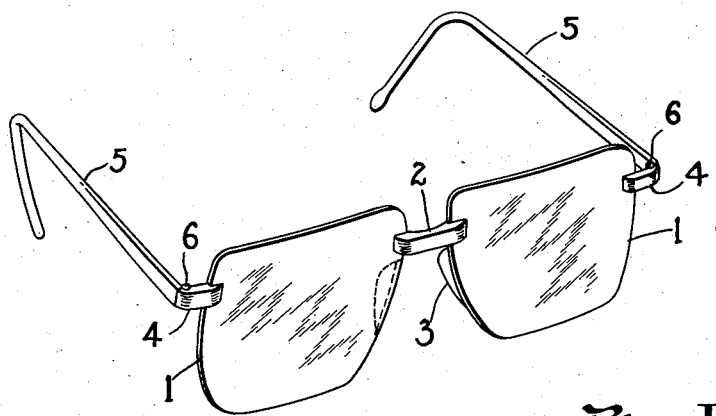
Fig. I
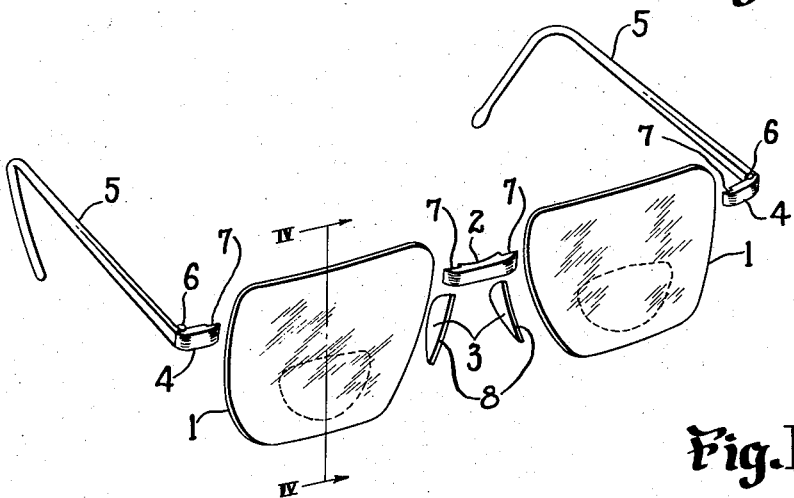
Fig. II
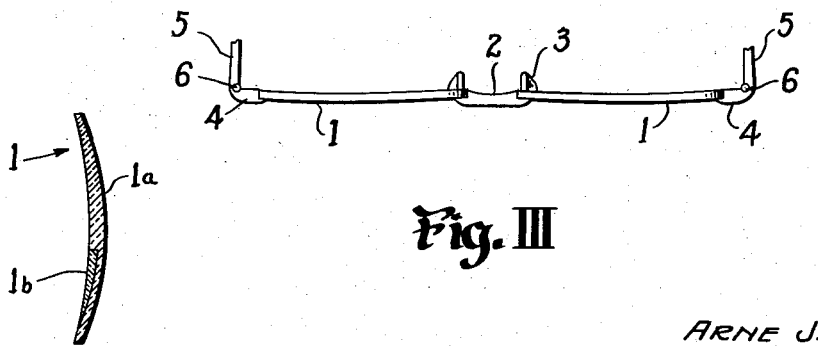
Fig. III
Fig. IV
INVENTOR
ARNE J. OKER.
BY Harry H. Styll
ATTORNEY Patented Jan. 6, 1942

2,269,037

UNITED STATES PATENT OFFICE 2,269,037

OPHTHALMIC MOUNTING

Arne J. Oker, Southbridge, Mass., assignor to American Optical Company, Southbridge, Mass., a voluntary association of Massachusetts Application October 14, 1937, Serial No. 168,952

6 Claims. (Cl. 88—41)

This invention relates to improvements in ophthalmic mountings and has particular reference to improved means of making the same.

The main object of this invention is to provide an ophthalmic mounting of relatively wear-resisting, infrangible, transparent, resinous material which is light in weight and cheap to manufacture.

One of the principal objects of the invention is to provide an ophthalmic mounting having the various portions thereof formed of artificial resin or resinoid, wherein the lenses, bridge, nose pads and temple end-pieces of the mounting may be simultaneously and integrally formed.

Another object of the invention is to provide an ophthalmic mounting having substantially all of its parts formed of artificial resin or resinoid, said mounting being constructed with interfitted parts which may be joined into an integral structure by a solvent which will render the interfitting surfaces of the parts semi-plastic whereupon they may be pressed and joined together without the necessity of cement or additional means.

Another object of the invention is to provide parts of an ophthalmic mounting including lenses, bridge, nose pads, temple supports, temples, etc., having varying designs and dimensional characteristics and which may be integrally joined with each other to complete a mounting of a given size by the use of a suitable solvent.

Another object is to provide an ophthalmic mounting which may be moulded or cast of artificial resin, resins, resinoid and/or resinoids having the properties of a vitreous body wherein the various parts may be formed with the same or different colors and with the lenses having absorption properties.

Another object is to provide an ophthalmic mounting in which lenses, formed of artificial resin or resinoid, and constructed with the various curves common to ophthalmic lenses, may be interchangeably assembled.

Another object of the invention is to provide an ophthalmic mounting having single parts or groups of parts moulded or cast with inserts or other materials integrally moulded or cast therewith.

Another object of the invention is to provide an ophthalmic mounting having substantially all of its parts formed of artificial resin or resinoid and said mounting being constructed with interfitted parts which may be joined into an integral structure by a solvent which will render the interfitting surfaces of the parts semi-plastic whereupon they may be assembled and adjusted to suit an individual and then pressed and joined together. Another object is to provide an ophthalmic mounting having the various portions thereof formed of artificial resin or resinoid wherein said parts may be positionally adjusted with respect to each other during the assembly of said mounting.

Still another object is to provide an ophthalmic mounting of relatively wear-resisting, infrangible, transparent, resinous material which is light in weight and cheap to manufacture, with each lens having one or more focal fields.

Other objects and advantages of the invention will become apparent from the following description taken in connection with the accompanying drawing and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described, as the preferred forms only have been shown by way of illustration.

Referring to the drawing:

Fig. I is a perspective view of an embodiment of this invention, showing the bridge, lenses, pads and endpieces integrally cast or moulded;

Fig. II is a perspective view of an embodiment of this invention, showing the various parts as separately cast or moulded and ready for assembly;

Fig. III is a plan view showing the parts in assembled relation; and

Fig. IV is a sectional view taken on line IV—IV of Fig. II.

It has been usual, in the past, to form ophthalmic mountings of metals, alloys, combinations of these, and of the material commonly known as zyl. In these mountings were fitted glass lenses of suitable properties. In the process of manufacture and assembly of mountings of these types, many difficult, expensive and lengthy operations were necessary.

The lenses of such mountings, in many instances, were very heavy, rigid, fragile, easily corroded or tarnished and limited as to type of surface curvatures which could be formed thereon. This was due to the fact that the surfaces had to be formed by mechanical curve generating means for efficient large scale production and to obtain the desired optical definition. Some attempts have been made, in the past, to mould lenses from glass, but such lenses have not been operable because it has been impossible to obtain optical surfaces which are good enough for general use.

The frames, also, in many instances, were very heavy, rigid, easily bent out of shape, easily corroded or tarnished, and limited as to shapes and colors. The fitting and assembly of these frames has been difficult, due to the unflexible nature of the materials which required mechanical connections and fixed positions of assembled parts.

Some attempts have been made, in the past, to avoid some of the prior art difficulties of making the lenses by utilizing cellulose compositions instead of glass. Some advantages such as that of producing a light, non-shatterable lens were obtained, but numerous disadvantages, such as the tendency of such compositions to be hazy and to become distorted, discolored and corroded during use were present.

The cellulose compositions having suitable mechanical properties for use in forming lenses, although of a non-shatterable nature, were readily inflammable. These compositions were also soft and susceptible to becoming scratched and spoiled optically and were also of a colloidal nature which causes diffusion of light and does not give clear optical images.

Attempts have also been made to produce a frame having light weight, flexibility, resilient rigidity, and non-corrosion properties, as well as to provide a variety of colors, sizes, shapes and designs. The results of these attempts were limited, however, by the unchanging properties of the metals or other materials. Some would give one desired feature and lack another. A medium had to be struck, which compromised with the features desired to produce a product having only a percentage of each of said features. Variety of parts and designs also was limited, due to the heavy expense of proper tools necessary to produce a wide range of sizes and shapes.

Again a compromise was made and a series of spaced sizes and only the most desirable standard colors and shapes could be made. This meant that an individual whose requirements came in between any of the standard values, had to be content with too much or too little.

It is, therefore, one of the primary objects of this invention to provide a composition and method of forming integral ophthalmic mountings and lenses therefrom wherein all of the above difficulties of the prior art will be obviated, and all of the advantages set forth in the description of the various objects of this invention will be obtained, particularly that of providing ophthalmic mountings which are relatively wear-resisting, infrangible, transparent, light weight, cheap to manufacture, and having lenses integrally formed or assembled therewith which are non-shatterable, light in weight, of good optical definition, and optical and mechanical properties, and which are not readily inflammable, all formed of a material which permits great flexibility of sizes, colors, designs and assembly at a relatively low cost.

Referring more particularly to the drawing, in which like characters of reference designate like parts throughout the several views, the lenses 1, bridge 2, pads 3, endpieces 4, temples 5, and hinges 6, embodying the invention as shown in Fig. I comprise vitreous members formed preferably of artificial resin such as polymerized acrylic esters but it is to be understood that resin, resins, resinoid and/or resinoids having the properties of a vitreous body such as polymerized vinyl compounds, polymerized acrylic ester compounds, metastyrene, formaldehyde, phenol-formaldehyde condensation products, urea condensation products, and other compounds having similar general properties, may be used if desired. It is to be understood that the above compositions have been set forth only by way of illustration and that applicant does not wish to be limited to these few specific compositions, as several other known compositions having the same general characteristics may be used.

The material used in forming the various parts of the device embodying the invention is light in weight and of a transparent, non-corrosive, relatively infrangible nature as compared with cellulose compositions.

It has characteristics permitting it to be moulded, cast, or pressed to the shapes desired and will retain such shapes during use.

For the purpose of ease in claiming the device embodying the invention, this material will be referred to hereinafter throughout the specification and claims as resinous material.

This resinous material may be handled in sheet form, which may be pressed to the shape desired in suitable formers, or it may be formed to a syrupy consistency, poured into suitable casting or moulding dies having the shape and dimensional characteristics of the various parts, or it may be subjected to a process of polymerization as follows:

A selection is made of suitable resins or mixtures of resins, etc., such as methyl methacrylate or other esters of methacrylic acid or of substituted acrylic acids capable of being polymerized to vitreous materials under the influence of heat and catalysts, such as benzoyl peroxide and/or similar compounds. In monomeric methyl methacrylate place 0.02% or more of benzoyl peroxide and heat in a glass or glass lined container equipped with a reflux condenser until polymerization begins and progresses until the partially polymerized methyl methacrylate attains a suitable syrupy consistency. The resulting intermediate product may be chilled to arrest or retard the polymerization.

A suitable quality of the partially polymerized intermediate product is poured or otherwise placed in a suitable mould. At the proper time the mould and material are heated to a temperature ranging from 60° to 85° C., which completes the polymerization.

Another treatment is to use this material in a powdered form, placing it in suitable forming dies having finished highly polished surfaces of the shapes and sizes desired on the various parts, and then subjecting the material and dies to the action of heat and pressure to shape the material and render it integral and solid.

Prior to these various treatments and during the forming of the materials in order to obtain the desired colors, suitable color dyes are mixed with the material. These dyes have substantially no effect upon the transmission of the visible rays or may have suitable retarding properties. Also, if desired, during the forming of the material, substances such as organic dyestuffs of the character of Sudan III, Chrysodin, etc., may be added to render the resultant parts infra-red or ultra-violet absorbing. In general, yellow or red dyestuffs solution in this manner will retard the ultra-violet rays and may be inserted in varying quantities depending upon the absorption properties desired.

Another method of producing infra-red absorption properties is to provide the finished part, ordinarily the lens, with a thin film of material, such as gold or aluminum, to reflect and/or absorb the infra-red rays; or ferrous compounds in finely divided form may be dispersed in the material in its unpolymerized condition to render the said resultant article infra-red absorbent.

Alkaloidal compounds, such as quinine, etc., may be dissolved in the material for the purpose of producing ultra-violet absorption, the quantity thereof being varied to control said absorption properties.

The material may be given hardness, and the index of refraction controlled, by the addition to the mixture, during the forming, of a chlorinated diphenyl derivative such as Aroclor #4465 or #1242, or effectively similar compounds.

It is also possible, if desired, to add to the base material a perfume with the formula for said material being substantially as follows: Monomeric methyl methacrylate 89 to 99.88%, benzoyl peroxide 0.02% to 1%, Jasminol or other perfume 0.1% to 10%. This causes the resultant article to give off a pleasing odor.

After the parts are assembled they may be treated to remove slight blemishes or the like, by the usual polishing methods common to the ophthalmic art or by use of liquid solvents.

With this invention, lenses having different optical properties, different powers, focal fields and prescriptive characteristics may be obtained, and lenses of varying sizes and shapes may be provided so that the resultant appearance of the ophthalmic mounting may be controlled, and various designs and combinations may be formed, and the length of temples, pupillary distance, inset and outset position, and the length of bridges may be simply and easily controlled, by the use of suitable mixtures, moulds and processes during the manufacture of ophthalmic mountings embodying the invention. Also, bridges of different designs may be similarly formed, endpieces and bridges may be positioned at the "on center" or high position on a lens, or at any other desired position. Slight variations of position or fit may be compensated for by the semi-plastic interfitting faces. No exactness of fit is required.

The resinous material used in this invention compares very favorably with Celluloid as well as with glass for producing a lens of variable density for the purpose of reducing glare and providing sunglasses for the use of athletes, sportsmen, and for general outdoor use.

As compared with Celluloid, it is relatively non-inflammable, it will hold its shape and not tend to warp, and the optical properties obtained are far superior to those possible of attainment with the use of Celluloid.

As compared with glass, it is substantially non-infrangible, much lighter in weight, has higher transmission to the visible rays, is clearer, and highly polished finished surfaces having optical properties may be obtained without abrading or grinding.

As compared with the metal or zyl which is in common use in ophthalmic mountings, this resinous material is superior in that it is much lighter in weight, it is non-corrosive, may be completely produced in its finished form with one moulding or casting operation instead of the many forming, cutting, drilling, tapping, soldering, polishing, fitting, and like operations which are necessary for the proper manufacture of a metal or zyl mounting.

Again referring to Fig. I, this invention consists, as illustrated, of a front portion of an ophthalmic mounting comprising lenses 1, bridge 2, nose pads 3, and endpieces 4, all of which may be simultaneously and integrally formed of the above mentioned resinous material. To this front portion, the temples 5, also formed, of resinous material, are attached by means of endpiece hinges 6, which may or may not be integrally and simultaneously formed with either the temples 5 or the endpieces 4, and may or may not be formed of resinous material.

An alternative structure is illustrated in Fig. II, in which each part is formed separately of resinous material, each part having interfitting surfaces designed for proper interassembly. These parts are assembled by pressing and joining them together with a solvent which will render the interfitting surfaces of the parts semi-plastic. The endpiece hinge 6, in this structure as in the integral structure of Fig. I, is preferably of the usual metal composition, and may be assembled separately or formed integrally with either the temple 5 or the endpiece 4 and then assembled to the other parts of the mounting.

The method of assembly of this alternative structure is as follows: A solvent, such as ethyl acetate, is applied to the surfaces which are to be in assembled contact making the interfitting surfaces semi-plastic, then these parts are moved slightly, and adjusted and positioned to the requirements of whatever individual is to use the mounting. Having positioned the various parts in this manner, they are then pressed or joined together for a permanent assembly. This provides a desirable means and method of fitting and adjusting ophthalmic mountings of an efficiency hitherto unapproachable in the art.

The lenses in this invention may be formed to any of the various types common to the ophthalmic art. Fig. IV shows a cross section of a lens embodying this invention, and having two focal fields, the distance vision portion 1a, and the reading or near vision portion 1b.

A major advantage of this invention is the ease with which a variety of designs and dimensional characteristics may be utilized in the forming of lenses, bridge, nose pads, temple supports, temples, and the like, and which may be integrally joined with each other to complete a mounting of a given size by the use of a suitable solvent.

In ophthalmic mountings of this type, that is, those moulded or cast of resinous material, there is a considerable advantage in that they may have the properties of a vitreous body wherein the various parts may be formed with the same or different colors and absorption properties— they would be especially valuable in this respect when used as inexpensive sunglasses. Their light weight, variability of design, ease of fitting, and true absorption qualities would present a combination of advantages unique in the low priced field.

The use to which this interchangeability of parts may be put is further pointed out in that lenses formed of resinous material, and constructed with the various curves common to ophthalmic lenses may be quickly, easily, and inexpensively interchanged in a frame of similar composition.

The moulding or casting of single parts or groups of parts is not confined to parts having resin or resinoid composition, that is, parts of other materials may be integrally cast or moulded with a part or group of parts having a resin or resinoid composition. For example, a metal hinge may be integrally cast or moulded in a resin or resinoid endpiece or temple.

This method and composition allows for great variety in the choice of parts, designs, groups of parts and the manner in which they may be assembled.

It will be noted that in instances wherein the various parts are formed separate of each other that each of said parts are provided with comating portions, for example, the endpieces 4 and ends of the bridge 2 provided with shouldered portions 7, so shaped as to engage and substantially fit with the side contour shape of the lenses and to be in overlying relation with a portion of the face of the lens. The nose pads 3 are also provided with an edge 8 which is shaped substantially to the contour of the lens adjacent the nasal side thereof so that it will be within limits of fit, whose variables may be compensated for by the softening brought about by the solvent used in securing the said pads to the lenses.

From the foregoing description, it will be seen that simple, efficient, and economical means have been provided for accomplishing all of the objects and advantages of the invention, particularly that of providing an ophthalmic mounting of relatively wear-resisting, infrangible, transparent, resinous material which is light in weight and cheap to manufacture.

Having described my invention, I claim:

1. In a device of the character described, a relatively light weight, onepiece molded structure of resinous material having the properties of a vitreous body and comprising a pair of rimless lens members, a bridge member holding said lenses in spaced aligned relation, nose pad members and temple supporting endpiece members, said bridge, endpieces and nose pads being secured directly to and forming an integral part of said rimless lenses by the intermingling of their structures with that of the lenses at their points of connection therewith, said bridge and said endpiece members each having a lens edge overlying and joining portion and a lens side surface overlying and joining portion with said side surface overlying portions all on one side of said lenses and with said joining portions and the area of the lenses immediately adjacent said portions being substantially entirely free of distortion and strain, said side surface overlying portions of said bridge and each of said endpieces each having a relatively thick portion adjacent the lens edge and a blending tapered portion extending across the lens side surface and terminating in a portion of considerably less thickness than said relatively thick portion.

2. In an ophthalmic mounting a pair of rimless lens members of good optical definition formed of a relatively light weight resinous material having the properties of a vitreous body and having predetermined ophthalmic characteristics and optically accurate surfaces, a relatively narrow and light weight molded bridge member formed of the same material as the lenses, secured directly to and connecting said lens members and integrally joined therewith by the intermingling of the structures of the bridge and the lenses at the points of connection, and endpiece and nose pad members formed of the same material as the lenses and all secured directly to and integrally joined with the said lenses by the intermingling of their structures and the structures of the lens members at their points of connection, said bridge and said endpiece members each having a lens edge overlying and joining portion and a lens side surface overlying and joining portion with said side surface overlying portions all on one side of said lenses and with said joining portions and the area of the lenses immediately adjacent said portions being substantially entirely free of distortion and strain, said side surface overlying portions of said bridge and each of said endpieces each having a relatively thick portion adjacent the lens edge and a blending tapered portion extending across the lens side surface and terminating in a portion of considerably less thickness than said relatively thick portion.

3. In an ophthalmic mounting a pair of rimless lens members of good optical definition formed of a relatively light weight resinous material having the properties of a vitreous body and having predetermined ophthalmic characteristics and optically accurate surfaces, a relatively narrow and light weight molded bridge member formed of the same material as the lenses, secured directly to and connecting said lens members and integrally joined therewith by the intermingling of the structures of the bridge and the lenses at the points of connection, and endpiece and nose pad members formed of the same material as the lenses and all secured directly to and integrally joined with the said lenses by the intermingling of their structures and the structures of the lens members at their points of connection, said bridge and said endpiece members having their rear faces substantially flush with the rear faces of the lenses and each having a lens edge overlying and joining portion and a lens side surface overlying and joining portion with said side surface overlying portions all on one side of said lenses and with said joining portions and the area of the lenses immediately adjacent said portions being substantially entirely free of distortion and strain, said side surface overlying portions of said bridge and each of said endpieces each having a relatively thick portion adjacent the lens edge and a blending tapered portion extending across the lens side surface and terminating in a portion of considerably less thickness than said relatively thick portion with said endpieces tapering from said relatively thick portions in a direction away from the lens to form a relatively narrow temple attachment portion.

4. In an ophthalmic mounting a pair of rimless lens members of good optical definition formed of a relatively light weight resinous material having the properties of a vitreous body and having predetermined ophthalmic characteristics and optically accurate surfaces, a relatively narrow and light weight molded bridge member formed of the same material as the lenses, secured directly to and connecting said lens members and integrally joined therewith by the intermingling of the structures of the bridge and the lenses at the points of connection, and endpiece and nose pad members formed of the same material as the lenses and all secured directly to and integrally joined with the said lenses by the intermingling of their structures and the structures of the lens members at their points of connection, said bridge and said endpiece members having their rear faces substantially flush with the rear faces of the lenses and each having a lens edge overlying and joining portion and a lens side surface overlying and joining portion with said side surface overlying portions all on one side of said lenses and with said joining portions and the area of the lenses immediately adjacent said portions being substantially entirely free of distortion and strain, said side surface overlying portions of said bridge and each of said endpieces each having a relatively thick portion adjacent the lens edge and a blending tapered portion extending across the lens side surface and terminating in a portion of considerably less thickness than said relatively thick portion and said nose pads being secured to said lenses along the nasal edges thereof in substantially flush relation with said lens edges and extending rearwardly therefrom with the upper portion of said pads lying in substantially adjacent relation with the said lens joining portions of the bridge.

5. In an ophthalmic mounting a pair of rimless lens members of optical definition formed of a relatively light weight resinous material having the properties of a vitreous body and having predetermined ophthalmic characteristics and substantially optically accurate surfaces, a bridge member of substantially the same material as the lenses, joined with said lens members by the intermingling of the materials of said bridge member with the material of said lenses at the point of joinder, and endpiece members formed of substantially the same material as the lenses joined therewith by the intermingling of the material of said endpieces with the material of said lenses at the point of joinder, said bridge and said endpiece members having at least a side surface overlying the plane of the adjacent surface of the lenses and an edge portion overlying the adjacent plane of the edge surface of the lenses, the portions of the bridge member and endpiece members adjacent the lenses being of a thickness greater than the adjacent thickness of the lenses, said side surfaces of the bridge member and the similar side surfaces of the endpiece members overlying the plane of the adjacent surfaces of the lenses being all on one side of said lenses.

6. In an ophthalmic mounting a pair of rimless lens members of optical definition formed of a relatively light weight resinous material having the properties of a vitreous body and having predetermined ophthalmic characteristics and substantially optically accurate surfaces, a normally separate bridge member of substantially the same material as the lenses, joined with said lens members by the intermingling of the materials of said bridge member with the material of said lenses at the point of joinder, and normally separate endpiece members formed of substantially the same material as the lenses joined therewith by the intermingling of the material of said endpieces with the material of said lenses at the point of joinder, said bridge and said endpiece members having at least a side surface overlying the plane of the adjacent surface of the lenses and an edge portion overlying the adjacent plane of the edge surface of the lenses, the portions of the bridge member and endpiece members adjacent the lenses being of a thickness greater than the adjacent thickness of the lenses.

ARNE J. OKER.